Dec. 30, 1969  C. D. RUSSELL  3,486,811
REAR VIEW MIRROR ANGLING DEVICE
Filed July 29, 1966

INVENTOR
CARL D. RUSSELL

BY Fisher, Christen, Sabol & Caldwell
ATTORNEYS

United States Patent Office 3,486,811
Patented Dec. 30, 1969

3,486,811
REAR VIEW MIRROR ANGLING DEVICE
Carl D. Russell, Muskogee, Okla., assignor, by mesne assignments, to Engineering Automotive Sciences Inc., a corporation of Maryland
Filed July 29, 1966, Ser. No. 568,918
Int. Cl. G02f 1/34
U.S. Cl. 350—289                          1 Claim

ABSTRACT OF THE DISCLOSURE

The invention comprises an electro-mechanical adapter assembly for connecting a vehicle mirror to its vehicle support while permitting angling of the mirror in opposed directions under control of the turn indicator lever which polarizes the electromagnet in one direction from the vehicle power system for angling the mirror to the right for right indicated turns and polarizes the electromagnet oppositely for angling the mirror to the left for left indicated turns, the adapter assembly permitting such movement under spring tension control adapted to return the mirror to its home position when signaling is terminated.

---

The present invention relates to a device for angling a conventional rearview vehicular mirror in order to avoid blind areas, particularly when the vehicle is being turned to the right or left.

While numerous inventions have been made in the field, the present invention is in the nature of a universal adapter for use with most existing mirror supporting structures. In addition, the present invention provides a much simpler, less expensive and more effective apparatus for achieving the desired result.

The apparatus of this invention enables the mirror to be angled to the right or to the left in accordance with the operation of the turn indicator signal lever. It achieves this action through the use of a single magnet actuated from the electrical system of the car, under the control of the turn indicator signal lever in either signalling position. A righthand turn indication polarizes the magnet in one direction, and a lefthand turn indication polarizes the magnet in the opposite direction, thereby causing the mirror to be angled in the proper direction.

An additional feature of the invention resides in the provision of a single centering spring which automatically returns the mirror to its normal position when no turn is indicated.

With the foregoing structure, an effective device is realized without resort to the usual pair of solenoids or magnetic devices incorporating linkages for translating motion in two different directions from any type motivating source. Rather, this invention concentrates on structure adapting the connection of the mirror, through a pivotal arrangement, to the body or windshield mounted universal ball attachment, and in so doing, permits the single magnetic motivating source to pivot the mirror relative to the vehicle, as desired; while maintaining the essential universal movement connection between the mirror and the vehicle.

Another feature of the invention resides in the simplified electrical control circuitry which permits the single magnetic control. Simple and inexpensive single switches are adapted to be connected to the steering housing and actuated, in pairs, by the indicator lever in its respective operational positions. Essentially this switching device simply reverses the connections from the automotive battery to the coil on the magnet, thereby reversing polarity, to reverse the direction of angling.

More particularly, the adapter structure of this invention may establish connection between a pivot arm structure (extending from a universal ball in the mirror) to the vehicular connection, i.e., on the windshield or vehicle frame. Alternatively the connection may be established between a ball connected by an arm to the mirror and the vehicular support. Either arrangement permits angular movement of the mirror, by the magnet, relative to the vehicle, and universal accommodation is achieved with minimal part substitution.

With the foregoing in mind, it will be appreciated that it is an object of this invention to provide an adapter structure capable of angling a mirror, under the control of the turn indicator lever.

Another object of the invention is the provision of such a structure of universal scope for adapting pivot arm or ball joint connections for such angling.

A further object of the invention is the provision of a mirror angling adapter structure, operative directly from a single magnet, which is polarized oppositely for opposite turn signal indications, and A still further object is the provision of such an apparatus incorporating a single spring for returning the mirror to normal position, in the absence of turn signal operation.

The foregoing will be more apparent from a reading of the following detailed description thereof when taken in light of the accompanying drawing wherein.

Figure 1:
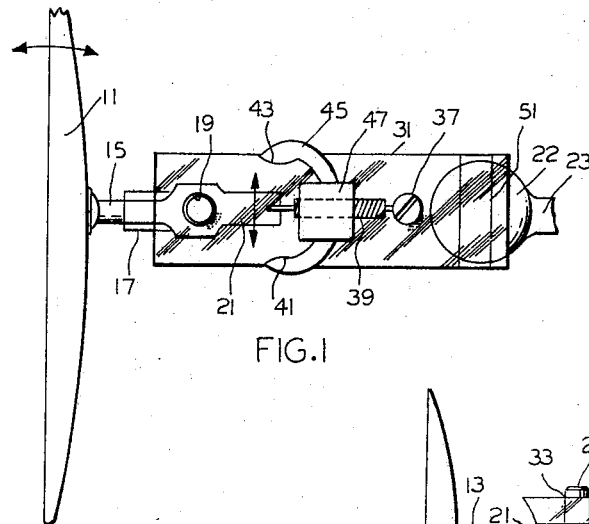
FIG. 1 is a view in side elevation of a first embodiment of the invention.
Figure 2:
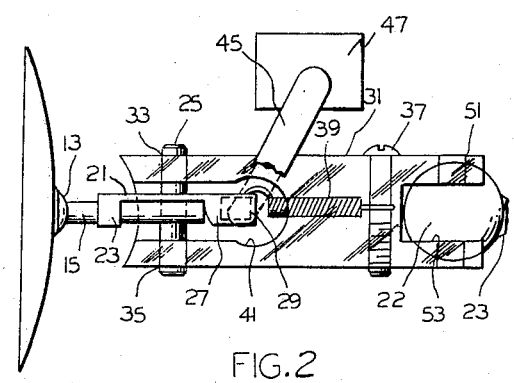
FIG. 2 shows the embodiment of FIG. 1 in plan.
Figure 3:
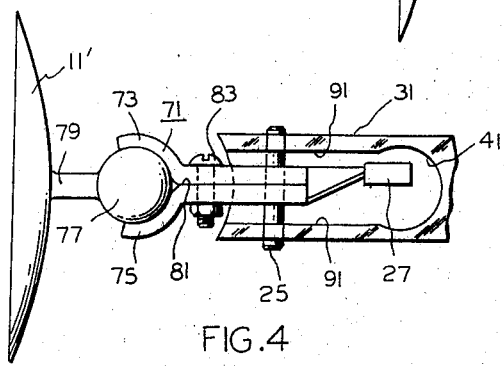
FIG. 3 is an enlarged view of a part of the structure of FIG. 2, primarily in section.

Referring now to FIG. 1, there is shown a conventional rearview mirror 11, having a universally mounted ball 13 with fixed pivot arm 15 extending therefrom. The pivot arm 15 includes a shoulder 17 and pivot hole 19.

It is the purpose of this invention to establish connection between this structure and the vehicle mounting structure, shown in dotted outline as the ball 22 and arm 23 for attachment to the vehicle (not shown). On existing cars the arm 23 will attach through a plate or the like, cemented to the windshield itself, but millions of vehicles are in existence in which the arm 23 attaches to the vehicle dashboard or frame above the windshield. In either event, the structure generally between the mirror 11 and the ball 22 comprises an embodiment of the present invention and enables the pivoting or angling of mirror 11 to the right or left, relative to arm 23 or the vehicular body to which it is attached.

Mirror connection means, in the form of lug 21, is provided to establish a rigid connection with pivot arm 15. The lug 21 includes bendable tabs or sleeve-shaped portion 23 which encompasses arm 15 just forward of the shoulder 17 to provide a gripping connection thereto. In addition, the lug 21 is apertured to conform to pivot opening 19 whereby a pin 25 may be disposed through both openings to establish a further connection between lug 21 and arm 15.

The opposite end of the lug 21 is preferably in the form of a sleeve-shaped or crimped portion 27, within which there may be disposed a slug 29 of magnetic material, which is necessary in certain applications to enhance the magnetic pulling power, particularly when lug 21 is formed of aluminum or other non-magnetic materials.

A plastic or the like housing 31, of cylindrical shape, is adapted to fit over the described structure and to receive pin 25 through opposed apertures 33 and 35. In addition, housing 31 is further apertured, near its rear end, to accommodate bolt 37 which provides an anchoring means for the single spring 39, connected from the sleeve end 29 of lug 21 to the bolt 37. Since spring 39 is tensioned to align itself with lug 21, it serves the purpose of centering the mirror 11, relative to housing 31, which centering position is the normal or unangled position of mirror 11.

The housing 31, although preferably of plastic material, is provided with laterally opposed apertures 41 and 43 into which opposed ends of a magnet 45 of horseshoe or substantially circular configuration has its ends located in order that they are in proximity with the sleeve 27 and slug 29, if the latter is employed. Coil 47 establishes flux in opposite directions, in accordance with the applied electrical polarity, for opposite orientation of the mirror 11. Thus, the magnet both pushes and pulls to orient mirror 11. Also the apertures 41 and 43 may open to the forward end of housing 31 to ensure that the pivot structure may be moved fully by the magnet 45.

The housing 31 is adapted to be secured to the ball 22 through the provision of internal peripheral groove 51 and the right end of housing 31 which is bifurcated or split along opposed sides, a shown at 53. The maximum diameter of ball 22 nests within grooves 51 and bolt 37 is tightened to compress the housing extremities at slot 53, thereby securing the housing 31 to ball 22.

Figure 4:
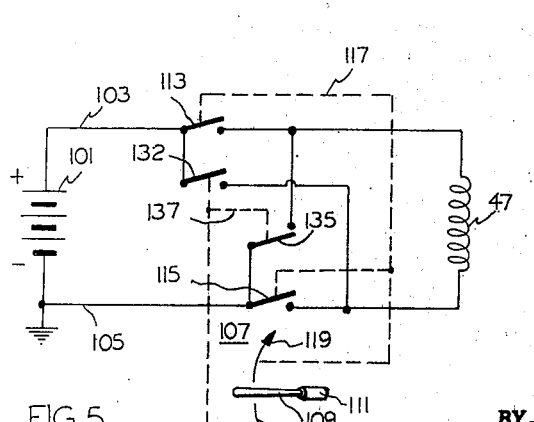
FIG. 4 is a view in side elevation of a further embodiment of the invention.

The embodiment of FIG. 4 is similar to the structure already described with the exception that lug 21 is replaced by lug 71 which is bifurcated and includes the arcuate gripping flanges 73 and 75 for receiving the ball 77, fixed to mirror 11 by arm 79. Lug 71 is split at 81 and the bolt 83 is adapted to be tightened to cause flanges 73 and 75 to grip ball 77. Otherwise the structure is the same with pin 25, housing 31, and sleeve 27 conforming to the parts correspondingly numbered. Also aperture 41 may be open along edge 91 to the forward end of housing 31 for the same reason.

Figure 5:
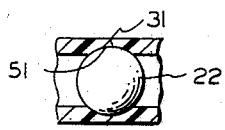
FIG. 5 is an electrical circuit diagram to show the operation of controlling the polarization of the magnet power source.

The electrical operating or control circuit is identical for both embodiments and is shown in FIG. 5. The automotive battery 101 supplies hot lead 103 and ground lead 105, which in turn extend by way of switch 107 to the coil 47 for magnet 45. The indicator turn signal arm 109 is connected to the steering wheel assembly (not shown) by way of support 111. Switches 113 and 115 are tied together, as indicated by the dotted line 117, such that when they are closed by the turn indicator 109 being pushed up or in the direction of arrow 119, lead 103 is extended through switch 113 to apply positive potential to the top side of coil 47 and lead 105 is extended through switch 115 to apply the negative potential to the bottom of coil 47 thereby causing the mirror 11 to be angled to its extreme position in one direction. It should be noted that this extreme position is limited because the sleeve 27 strikes against the end of the magnet, drawing the sleeve toward it, to serve as not only the driving source but also a stop limit means.

When the indicator lever arm 109 is turned to the opposite direction, i.e., corresponding to arrow 131, switches 133 and 135 are closed over common connection 137 to apply the plus potential from lead 103 to the bottom of coil 47 via switch 133 and the negative potential from lead 105 to the top of coil 47 via switch 135.

When turn lever 109 is in its normal or non-indicating condition, all switches are open, as illustrated, and the magnet 45 is de-energized such that spring 39 maintains the mirror in its normal position.

What is claimed is:
1. An adaptor assembly for connecting a vehicular mirror to a vehicle support to premit angling of the mirror in opposed directions relative to the vehicle under control of the turn indicator lever and powered by the vehicle battery system comprising in combination, a member extending from the mirror comprising an arm fixed to the mirror and having an apertured shoulder portion extending therefrom; means for fixedly gripping said member; said fixedly gripping means comprising an apertured lug having a forward sleeve-like portion adapted to grip said arm and bear against the shouldered portion; a housing receiving said gripping means through one end thereof; means establishing a pivotal connection between the housing and the gripping means whereby the mirror may be angled relative to the housing; said pivotal connection comprising pin means penetrating the housing and said apertured lug and shouldered portion so that said lug fixedly grips said arm and shouldered portion; spring means connected between the housing and the gripping means for normally holding said mirror in an unangled position relative to the housing; said housing comprising means at its opposite end for engaging the vehicle support for universal movement; a magnet disposed in proximity with the gripping means and supported by the housing for angling the mirror in opposite directions when polarized oppositely; and means for polarizing said target comprising coil means disposed on the magnet; connections from said coil means to the vehicle battery system; and switching means interposed in said connections operable by the turn indicator lever when in one position for polarizing the magnet in one direction and when in another position for polarizing the magnet in the other direction.

References Cited

UNITED STATES PATENTS

| 2,413,894 | 1/1947 | Sorensen | 248—481 |
| 2,957,386 | 10/1960 | Robinson | 350—6 |
| 2,783,683 | 3/1957 | Maurer | 350—307 X |
| 3,199,075 | 8/1965 | Simmons | 350—289 X |

DAVID SCHONBERG, Primary Examiner

R. L. SHERMAN, Assistant Examiner